(12) United States Patent
Wang

(10) Patent No.: US 9,462,881 B2
(45) Date of Patent: Oct. 11, 2016

(54) MULTI-STROKE TELESCOPING APPARATUS

(71) Applicant: Chun-Tsair Wang, Taichung (TW)

(72) Inventor: Chun-Tsair Wang, Taichung (TW)

(*) Notice: Subject to any disclaimer, the term of this patent is extended or adjusted under 35 U.S.C. 154(b) by 0 days.

(21) Appl. No.: 14/670,397

(22) Filed: Mar. 26, 2015

(65) Prior Publication Data

US 2015/0285430 A1    Oct. 8, 2015

(30) Foreign Application Priority Data

Apr. 3, 2014    (TW) .............................. 103112410 A

(51) Int. Cl.
| | | |
|---|---|---|
| *F16M 11/26* | (2006.01) | |
| *A47B 9/20* | (2006.01) | |
| *F16M 11/18* | (2006.01) | |
| *F16M 11/28* | (2006.01) | |
| *A47B 9/04* | (2006.01) | |
| *A47B 9/12* | (2006.01) | |
| *A47C 19/04* | (2006.01) | |
| *A61G 7/012* | (2006.01) | |
| *A61G 13/06* | (2006.01) | |

(52) U.S. Cl.
CPC . *A47B 9/20* (2013.01); *A47B 9/04* (2013.01); *A47B 9/12* (2013.01); *A47C 19/045* (2013.01); *F16M 11/18* (2013.01); *F16M 11/28* (2013.01); *A47B 2200/0056* (2013.01); *A61G 7/012* (2013.01); *A61G 13/06* (2013.01)

(58) Field of Classification Search
CPC ............ A47B 9/20; A47B 9/12; A47B 9/04; F16M 11/18; F16M 11/28; A61G 13/06; A61G 7/012
USPC ............... 248/188.5; 108/147, 147.19; 5/611
See application file for complete search history.

(56) References Cited

U.S. PATENT DOCUMENTS

| | | | | |
|---|---|---|---|---|
| 2009/0072101 | A1* | 3/2009 | Stoelinga | A47B 9/12 248/188.5 |
| 2010/0187380 | A1* | 7/2010 | Koder | A47B 9/12 248/188.5 |
| 2014/0360415 | A1* | 12/2014 | Riis | A47B 9/20 108/147.19 |
| 2015/0285430 | A1* | 10/2015 | Wang | A47B 9/04 248/188.5 |
| 2015/0290058 | A1* | 10/2015 | Panzer | A61G 7/012 403/109.6 |
| 2016/0037907 | A1* | 2/2016 | Ergun | A47B 9/12 108/147 |

* cited by examiner

*Primary Examiner* — Todd M Epps

(74) *Attorney, Agent, or Firm* — Wang Law Firm, Inc.

(57) ABSTRACT

Disclosed is a multi-stroke telescoping apparatus. Applying a modularized design can expand the number of a plurality of lifting units to perform the multi-stroke according to actual requirement. In addition, a relative linear movement between the pluralities of lifting units enables the multi-stroke telescoping apparatus to be telescoped simultaneously. The multi-stroke telescoping can be performed according to the number of the lifting units.

10 Claims, 5 Drawing Sheets

MULTI-STROKE TELESCOPING APPARATUS

CROSS-REFERENCE TO RELATED APPLICATION

This application claims priority from Taiwan Patent Application No. 103112410, filed on Apr. 3, 2014, in the Taiwan Intellectual Property Office, the content of which are hereby incorporated by reference in their entirety for all purposes.

BACKGROUND OF THE INVENTION

1. Field of the Invention

This application relates to a multi-stroke telescoping apparatus, and more particularly, to a telescoping apparatus which is able to adjust the multi-stroke simultaneously.

2. Description of the Related Art

In general, each user's body shape is different and the current furniture or office furniture is mostly designed as a fixed form, users thus have to adjust and adapt the height of the fixed form. Moreover, a long-time usage of those furniture or office furniture designed as the fixed form may cause discomfort to the users easily. At present, there are various telescoping apparatuses designed to improve such shortcomings.

The current telescoping apparatuses, however, are of complex structure and have higher demands for the manufacturing process, and the assembly process is minute and complicated. The production cost may therefore increase, resulting that the price of the telescoping apparatuses is remaining obstinately high.

Furthermore, the structure of each of the telescoping sections of the current telescoping apparatuses is telescoped in a descending order of its size, it is therefore incapable of achieving the objective of expanding the assembly module so as to extend the telescoping stroke based on actual requirement, owing to the limitations of the structural strength, assembly process and other technical problems of the conventional telescoping apparatuses.

With the advent of an aging society, if the height of the mattress is able to be adjusted appropriately to adapt the seniors or patients when they are rising out of or lying on the bed, the potential risk may thereby be reduced significantly. Nonetheless, the price of the current nursing beds with lifting capabilities keeps raising and it is difficult to be spreaded.

In conclusion, the inventor of the present invention has been mulling it over, and therefore designs a multi-stroke telescoping apparatus which aims to improve the current drawbacks and to promote the industrial applicability.

SUMMARY OF THE INVENTION

In view of the foregoing technical problems, objective of the present invention provides a multi-stroke telescoping apparatus, which applies a modularized design to simultaneously adjust the multi-stroke to save time.

In view of the foregoing technical problems, objective of the present invention provides a multi-stroke telescoping apparatus, which is capable of telescoping each of the telescoping sections of the current telescoping apparatuses in an ascending order of its size, so as to extend the telescoping stroke based on actual requirement.

In view of the foregoing technical problems, objective of the present invention provides a multi-stroke telescoping apparatus, which applies the modularized design to reduce the difficulty of assembling the conventional telescoping apparatuses.

In view of the foregoing technical problems, objective of the present invention provides a multi-stroke telescoping apparatus, which applies the modularized design to effectively save the cost of the components of the telescoping apparatus and reducing the production cost.

According to the aforementioned objectives, the present invention provides a multi-stroke telescoping apparatus, which may include an actuating unit, a first lifting unit, a plurality of second lifting units and a hollow shell. The actuating unit may include a reduction motor, a guide screw, a connecting block, a controller and a fixed base, wherein the guide screw is connected to the reduction motor, the reduction motor can be fixed on the fixed base and controlled by the controller, and the connecting block is screwed on the guide screw. The first lifting unit may include a hollow shell and two lifting mechanisms, the first lifting unit telescoped outside the actuating unit, the connecting block disposed at one end of the hollow shell, the two lifting mechanisms respectively disposed at two relative side surfaces of the hollow shell, a sliding groove disposed at a side surface of the lifting mechanisms, each of the lifting mechanisms including two sliding wheels, a first connecting member, a second connecting member and a driving member. The two sliding wheels are respectively disposed around two ends of the sliding groove, the driving member is respectively engaged with the two sliding wheels so as to connect to the first connecting member and the second connecting member. The first connecting member is connected to a top block of the guide screw and moving along the sliding groove, such that the first connecting member and the second member perform a linear movement relatively. The components of each of the plurality of second lifting units may be identical to that of the first lifting unit and telescoped outside the first lifting unit in an ascending order of size, the second connecting member of each of the plurality of second lifting units is connected to the first connecting member of the first lifting unit and moving along the sliding groove of the second lifting unit. The plurality of hollow female members may be telescoped outside the plurality of second lifting units, the plurality of hollow female members having identical form and different sizes, and the plurality of hollow female members telescoped in order, wherein an outermost hollow female member of the plurality of hollow female members is connected to the fixed base. When the guide screw is rotating, a position of the connecting block related to the fixed base is adjusted to simultaneously drive the first lifting unit, the plurality of second lifting units and the plurality of hollow female members to perform a telescoping stroke.

Preferably, the first lifting unit and the plurality of second lifting units may perform a cross telescoping.

Preferably, a plurality of pneumatic springs may be included to assist the multi-stroke telescoping apparatus of the present invention in bearing an external loading.

Preferably, the plurality of pneumatic springs may be disposed between an innermost hollow female member of the plurality of hollow female members and an outermost second lifting unit of the plurality of the second lifting units.

Preferably, the plurality of pneumatic springs may be disposed uniformly to distribute the loading equally.

Preferably, the plurality of hollow female members may be formed correspondingly with each other.

Preferably, the driving member may include a chain set, a steel rope set, or a belt set.

The present invention provides herein a lifting table which may include a tabletop, a plurality of aforementioned multi-stroke telescoping apparatuses and a control unit. The plurality of multi-stroke telescoping apparatuses may be disposed under the tabletop for supporting the tabletop. The control unit may be electrically connected to the controllers of the plurality of multi-stroke telescoping apparatuses to simultaneously control the plurality of multi-stroke telescoping apparatuses to adjust a height of the tabletop for adapting adjustment.

The present invention further provides a folding lifting bed which may include a folding mattress, a plurality of aforementioned multi-stroke telescoping apparatuses, a support frame and a control unit. The folding mattress may include a plurality of mattresses pivotally connected with each other. The plurality of multi-stroke telescoping apparatuses may be disposed under the folding mattress for lifting or folding the folding mattress as actual requirement. The plurality of multi-stroke telescoping apparatuses may be arranged to dispose on the support frame relatively. The control unit may be electrically connected to the controllers of the plurality of multi-stroke telescoping apparatuses to respectively control the linear movement of each of the plurality of multi-stroke telescoping apparatuses.

Preferably, the support frame may further include a plurality of moving wheelsets for moving the folding lifting bed.

The primary objective of the present invention mainly aims to provide a multi-stroke telescoping apparatus without affecting the existing functions of the conventional telescoping apparatus. The provided invention may have one or more advantages as follows.

Multi-stroke. Applying a plurality of lifting units telescoped in order of its size, as well as the relative linear movement between the lifting mechanisms, only a regular amount of stroke is necessary to obtain a multi-stroke telescoping amount; such that the operation time can be save efficiently.

Expanding assembly. Applying the modularized design and telescoping each of the telescoping sections of the telescoping apparatus in an ascending order of its size is able to resolve the problem of the conventional telescoping apparatus which cannot be expanded.

Simple manufacturing process. The complex assembly process of the conventional telescoping apparatus can be improved effectively, so that the manufacturing process can be simplified to save the assembly time.

Cost reduction. Applying the modularized design is able to effectively reduce the cost of the components of the lifting unit and the production cost.

Distribution of the loading. Telescoping the multi-layered members is able to distribute the loading, such that each component can avoid being damaged due to excessive loading.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

The exemplary embodiments of the present invention will be understood more fully from the detailed description given below and from the accompanying drawings of various embodiments of the invention, which, however, should not be taken to limit the invention to the specific embodiments, but are for explanation and understanding only.

Figure 1:
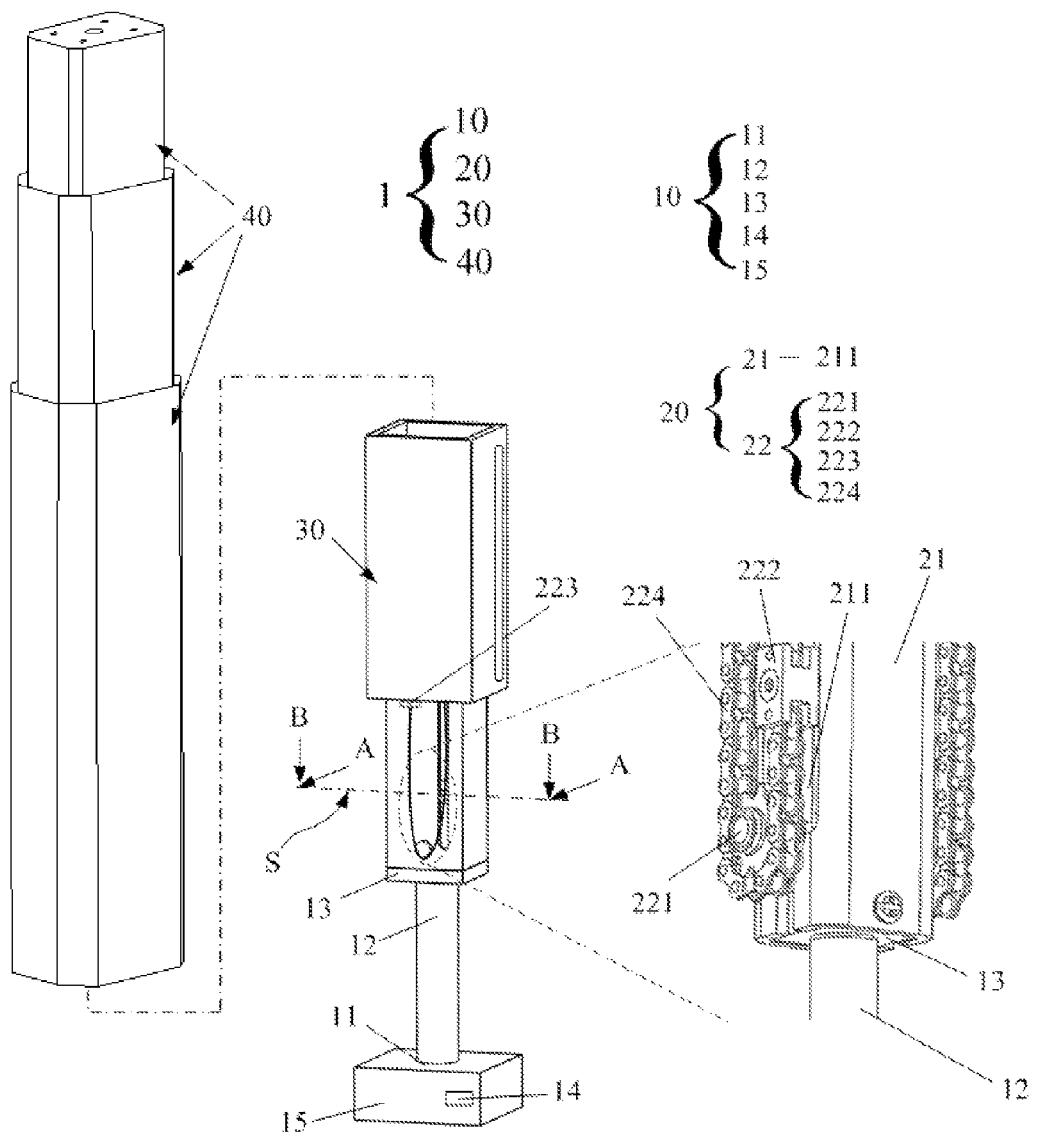
FIG. 1 is a schematic diagram of a multi-stroke telescoping apparatus of the present invention.
Figure 2:
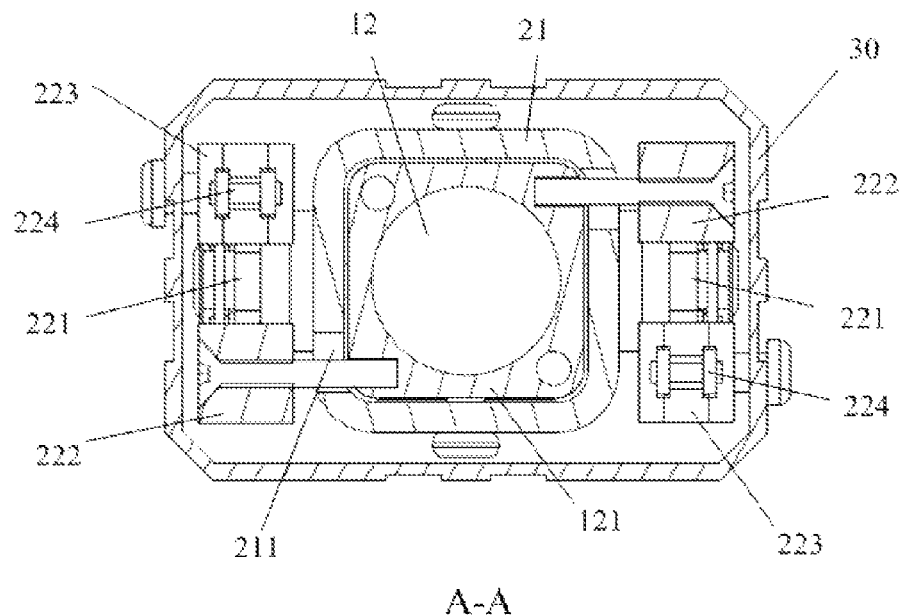
FIG. 2 is a partial cross-sectional diagram of the multi-stroke telescoping apparatus of the present invention shown in FIG. 1 along the section line A-A.
Figure 3:
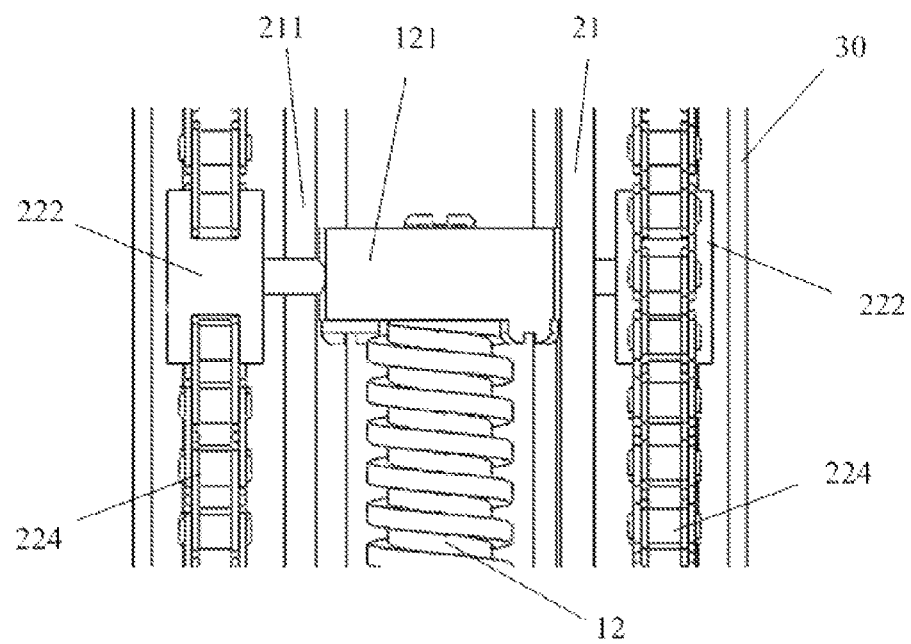
FIG. 3 is a partial cross-sectional diagram of the multi-stroke telescoping apparatus of the present invention shown in FIG. 1 along the section line B-B.

Please refer to FIG. 1 to FIG. 3 together. FIG. 1 is a schematic diagram of a multi-stroke telescoping apparatus of the present invention. FIG. 2 is a partial cross-sectional diagram of the multi-stroke telescoping apparatus of the present invention shown in FIG. 1 along the section line A-A. FIG. 3 is a partial cross-sectional diagram of the multi-stroke telescoping apparatus of the present invention shown in FIG. 1 along the section line B-B. As shown in FIGS. 1-3, a multi-stroke telescoping apparatus 1 includes an actuating unit 10, a first lifting unit 20, a plurality of second lifting units 30 and a plurality of hollow female members 40. Form of a hollow shell 21 of the first lifting unit 20 and forms of the plurality of hollow female members 40 are relatively with each other and may be even polygonal, such as quadrilateral, hexagon, octagon, and so on. The plurality of hollow female members 40 can be designed as any identifiable forms without affecting the structural strength. The exemplary embodiment of the present invention applies a quadrilateral as an example, but it shall be not limited thereto. The more of the number of the lateral of the form of hollow female member 40, the larger of the space can be used to arrange the more driving mechanisms to bear the greater loading but the higher of the production cost.

The actuating unit 10 includes a reduction motor 11, a guide screw 12, a connecting block 13, a controller 14 and a fixed base 15. The guide screw 12 is connected to the reduction motor 11, the reduction motor 11 is fixed on the fixed base 15 and controlled by the controller 14, and the connecting block 13 is screwed on the guide screw 12.

The first lifting unit 20 includes a hollow shell 21 and two lifting mechanisms 22. The first lifting unit 20 is telescoped outside the actuating unit 10. The connecting block 13 is disposed at one end of the hollow shell. The two lifting mechanisms 22 are respectively disposed at two relative side surfaces of the hollow shell 21. The sliding groove 211 is disposed at a side surface of the lifting mechanisms 22. Each of the lifting mechanisms 22 includes two sliding wheels 221, a first connecting member 222, a second connecting member 223 and a driving member 224. The two sliding wheels 221 are respectively disposed around two ends of the sliding groove 211. The driving member 224 is respectively engaged with the two sliding wheels 221 so as to connect the first connecting member 222 and the second connecting member 223. The first connecting member 222 is connected to a top block 121 of the guide screw 12 and moves along the sliding groove 221, such that the first connecting member 222 and the second member 223 perform a linear movement relatively. Wherein, the relative components of the first lifting unit is further shown at the line S with the section line A-A and the section line B-B, respectively, for more clearly (As shown in the FIGS. 2-3).

The lifting mechanisms 22 of the present invention apply a set of rollers as the basic structure. Hereby, the complicated assembly process of the conventional telescoping apparatus is simplified to save the manufacturing time. A systematical arrangement is applied to improve the technical problem concerning that components of the conventional telescoping apparatus may be damaged easily as the excessive loading, improper usage and uneven force. The driving member 224 may include a chain set, a steel rope set, or a belt set based on actual requirement. When a chain set is applied to the driving member 224, the two rollers 221 are applied as the chain wheel set. A chain set is merely applied in the present invention for an exemplary embodiment, but it shall be not limited thereto.

The components and the structure of each of the plurality of second lifting units 30 may be identical to that of the first lifting unit 20 and telescoped outside the first lifting unit 20 in an ascending order of size. The second connecting member 223 of the plurality of second lifting units 30 is connected to the first connecting member 222 of the first lifting unit 20 and moves along the sliding groove 211 of the plurality of second lifting units 30. The first lifting unit 20 and the plurality of second lifting units 30 may be disposed as a staggered arrangement to save the assembly space.

The plurality of hollow female members 40 telescoped outside the plurality of second lifting units 30 are aimed to avoid the impurity, such as environmental dust or oil stain which directly attaches to the lifting mechanisms 22 of the first lifting unit 20 and the plurality of second lifting units 30, resulting that the lifting mechanisms 22 is capable of running perfectly. The plurality of hollow female members 40 have the same form and different sizes, and are telescoped in order. The outermost hollow female member 40 of the plurality of hollow female members 40 is connected to the fixed base 15. Besides, telescoping multi-layered shells is able to distribute the loading, and benefits each component from being damaged due to excessive loading.

Figure 4:
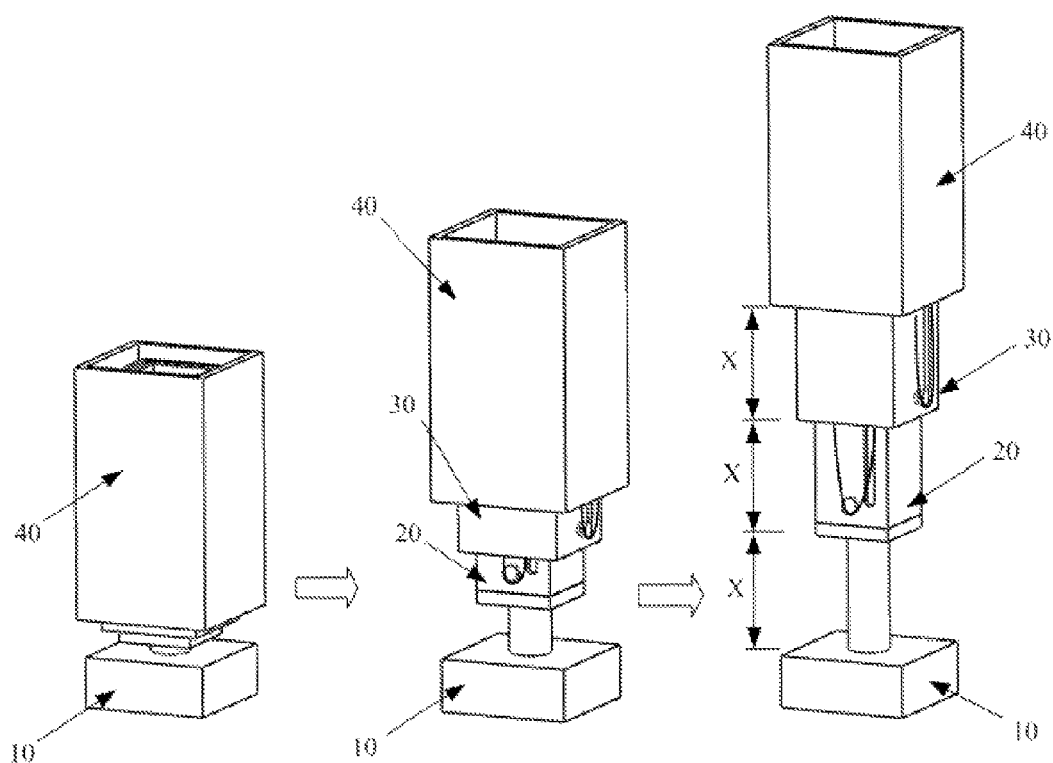
FIG. 4 is a schematic diagram illustrating the movement of a multi-stroke telescoping apparatus of the present invention.

Please refer to FIG. 4 which is a schematic diagram illustrating the movement of a multi-stroke telescoping apparatus of the present invention. As shown in the FIGS. 1-4, the connecting block 13 screwed with the guide screw 12 is disposed at the bottom end of the hollow shell 21, and then the first connecting member 222 is penetrated the sliding groove 211 and connected to the top block 121 of the guide screw 12. When the guide screw 12 of the actuating unit 10 is rotating, the connecting block 13 is served a movable part, the first connecting member 222 is regarded as a fixed part, and the first connecting member 222 and the second connecting member 223 are connected by the driving member 224, such that the hollow shell 21 performs a linear movement along the sliding groove 211 to adjust a spacing distance X between the first lifting unit 20 and the fixed base 15.

The second connecting member 223 of the second lifting unit 30 is connected to the first connecting member 222 of the first lifting unit 20 and moves along the sliding groove 211 of the plurality of second lifting units 30, such that the actuating unit 10, the first lifting unit 20, the plurality of second lifting units 30, and the hollow female members 40 are able to perform a linear movement relatively, facilitating the multi-stroke telescoping apparatus 1 to achieve a multi-stroke telescoping with a multiple spacing distance X. In the FIG. 3, in order to demonstrate clearly the movement of the present invention, it only illustrates that the innermost hollow female member 40 of the plurality hollow female members 40 is connected to the second lifting units 30 for more details.

Furthermore, a plurality of pneumatic springs (not shown) are disposed between the innermost hollow female member 40 of the plurality of hollow female members 40 and the outermost second lifting unit 30 of the plurality of the second lifting units 30 to assist in bearing external loading. The plurality of pneumatic springs are disposed uniformly to distribute the loading equally. Apart from bearing the loading, the arrangement of the plurality of pneumatic springs further avoids the related components being damaged owing to over-repression.

Figure 5:
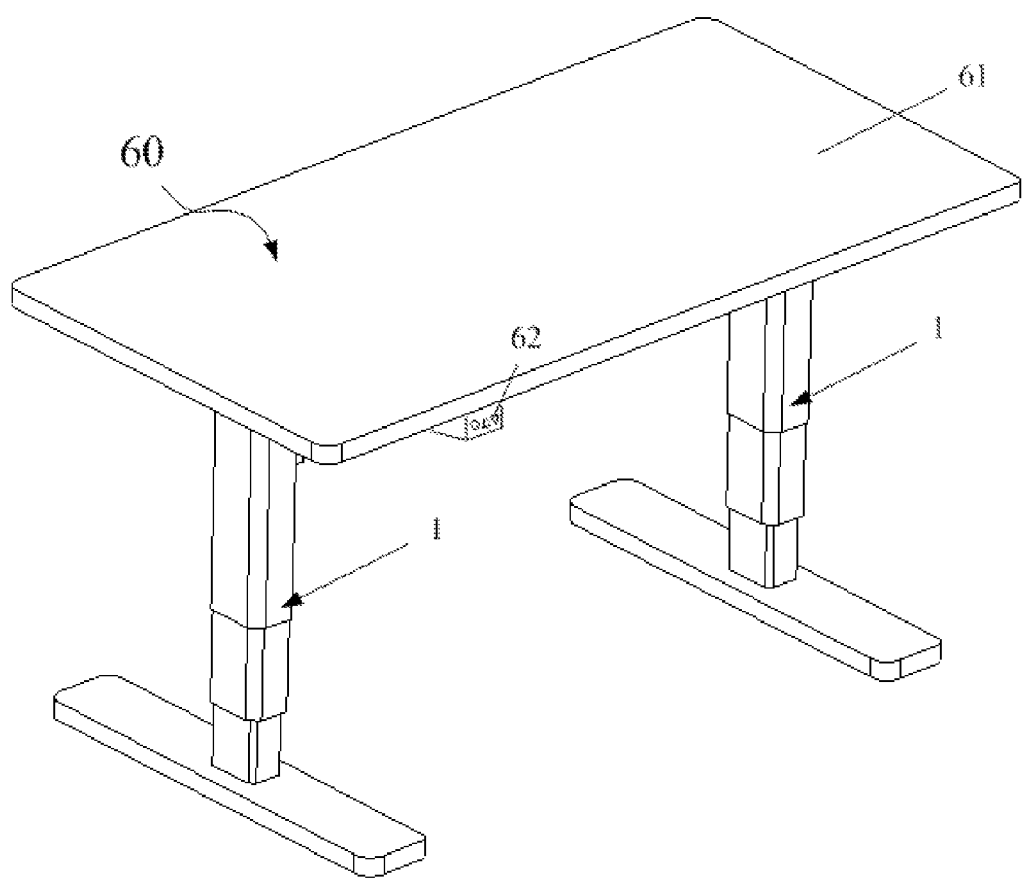
FIG. 5 is a schematic diagram of the first exemplary embodiment of a multi-stroke telescoping apparatus of the present invention.

Please refer to FIG. 5 which is a schematic diagram of the first exemplary embodiment of a multi-stroke telescoping apparatus of the present invention. The present embodiment discloses a lifting table 60 including a tabletop 61, a plurality of multi-stroke telescoping apparatuses 1 and a control unit 62 for adjusting the vertical height of the lifting table 60 based on actual requirement. The components and the structure included in the plurality of multi-stroke telescoping apparatuses 1 have been described in the foregoing paragraphs, and the unnecessary details are therefore no longer given herein.

The plurality of multi-stroke telescoping apparatuses 1 are disposed under the tabletop 61 to support the tabletop 61. The control unit 62 is electrically connected to the controllers 14 of the plurality of multi-stroke telescoping apparatuses 1 to simultaneously control the plurality of multi-stroke telescoping apparatuses 1. The height of the tabletop 61 can be adjusted to adapt the required height of the user.

Figure 6:
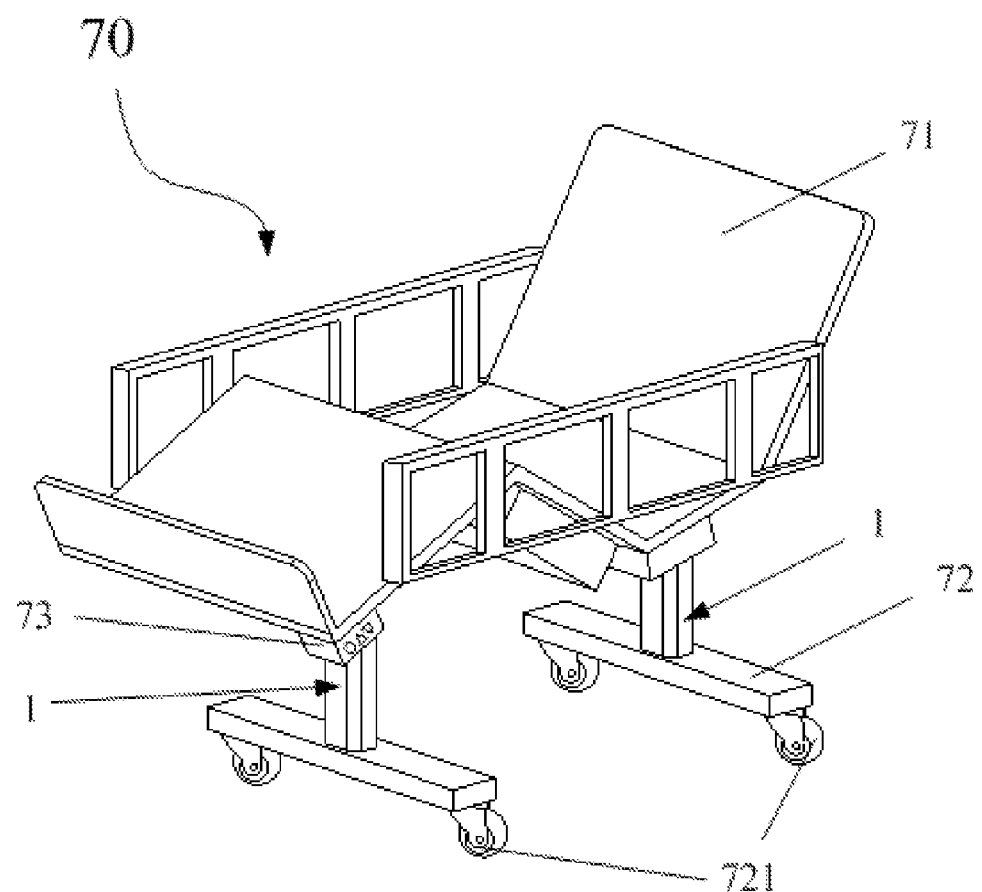
FIG. 6 is a schematic diagram of the second exemplary embodiment of a multi-stroke telescoping apparatus of the present invention.

Please refer to FIG. 6 which is a schematic diagram of the second exemplary embodiment of a multi-stroke telescoping apparatus of the present invention. The present embodiment discloses that the multi-stroke telescoping apparatus 1 is applied to a folding bed 70. The folding lifting bed 70 is mainly formed of a folding mattress 71, the plurality of multi-stroke telescoping apparatuses 1, a support frame 72 and a control unit 73. The components and the structure included in the multi-stroke telescoping apparatus 1 have been described in the preceding paragraphs clearly, and the unnecessary details are no longer given herein. The folding mattress 71 includes a plurality of mattresses which are pivotally connected with each other.

The plurality of multi-stroke telescoping apparatuses 1 are disposed under the folding mattress 71 by a universal joint, facilitating the folding mattress 71 being lifted or folded according to actual requirement. Nonetheless, the plurality of multi-stroke telescoping apparatuses 1 are disposed on the support frame 72 relatively. The control unit 73 is electrically connected to the controllers 14 of the plurality of multi-stroke telescoping apparatuses 1 to respectively control the linear movement of each of the plurality of multi-stroke telescoping apparatuses 1. The support frame 72 further includes a moving wheelset 721, facilitating the folding lifting bed 70 to move.

For example, when the folding lifting bed 70 is disposed with two sets of the multi-stroke telescoping apparatuses 1, the two sets of multi-stroke telescoping apparatuses 1 are disposed at two sides of the support frame 72, and the control unit 73 simultaneously controls the two sets of multi-stroke telescoping apparatuses 1 to descend the folding lifting bed 70 gradually, facilitating the seniors or patients rising out of or lying on the bed, such that the risk resulted from inappropriate movement may be avoided.

When the seniors or patients lay down on the folding lifting bed 70, the multi-stroke telescoping apparatuses 1 are simultaneously controlled to lift the folding lifting bed 70 gradually, facilitating the clinical personnel or family to perform the nursing service. When the two sets of multi-stroke telescoping apparatuses 1 perform lifting respectively, the folding mattress 71 is folded with a limited angle, so as to assist the user in changing the pose.

Moreover, if three sets of the multi-stroke telescoping apparatuses 1 are disposed in the folding lifting bed 70, two sets of the multi-stroke telescoping apparatuses 1 are disposed at one side of the support frame 70 and the remaining set of the multi-stroke telescoping apparatus 1 is disposed at the other side of the support frame 72. However, the two sets of the multi-stroke telescoping apparatuses 1 disposed at the same side have to be disposed symmetrically, such that the loading can be distributed equally. Besides, adjusting the two sets of the multi-stroke telescoping apparatuses 1 disposed at the same side to rotate the folding mattress 71 slightly with a certain angles facilitates the caregiver performing the nursing service.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A multi-stroke telescoping apparatus, comprising:
   an actuating unit, comprising a reduction motor, a guide screw, a connecting block, a controller and a fixed base, the guide screw connected to the reduction motor, the reduction motor fixed on the fixed base and controlled by the controller, and the connecting block screwed on the guide screw;
   a first lifting unit, comprising a hollow shell and two lifting mechanisms, the first lifting unit telescoped outside the actuating unit, the connecting block disposed at one end of the hollow shell, the two lifting mechanisms respectively disposed at two relative side surfaces of the hollow shell, a sliding groove disposed at a side surface of the lifting mechanisms, each of the lifting mechanisms comprising two sliding wheels, a first connecting member, a second connecting member and a driving member, the two sliding wheels respectively disposed around two ends of the sliding groove, the driving member respectively engaged with the two sliding wheels so as to connect to the first connecting member and the second connecting member, the first connecting member connected to a top block of the guide screw and moving along the sliding groove, such that the first connecting member and the second connecting member perform a linear movement relatively;
   a plurality of second lifting units, components of each second lifting unit identical to that of the first lifting unit and telescoped outside the first lifting unit in an ascending order of size, a second connecting member of the plurality of second lifting units connected to the first connecting member of the first lifting unit and moving along the sliding groove of the plurality of second lifting units; and
   a plurality of hollow female members, telescoped outside the plurality of second lifting units, the plurality of hollow female members having identical form and different sizes, and the plurality of hollow female members telescoped in order, wherein an outermost hollow female member of the hollow female members is connected to the fixed base;
   wherein when the guide screw is rotating, a position of the connecting block related to the fixed base is adjusted to simultaneously drive the first lifting unit, the plurality of second lifting units and the plurality of hollow female members to perform a telescoping stroke.

2. The multi-stroke telescoping apparatus of claim 1, wherein the first lifting unit and the plurality of second lifting units perform a cross telescoping.

3. The multi-stroke telescoping apparatus of claim 1, further comprising a plurality of pneumatic springs assisting to bear an external loading.

4. The multi-stroke telescoping apparatus of claim 3, wherein the plurality of pneumatic springs are disposed between an innermost hollow female member of the plurality of hollow female members and an outermost second lifting unit of the plurality of the second lifting units.

5. The multi-stroke telescoping apparatus of claim 3, wherein the plurality of pneumatic springs are disposed uniformly to distribute the loading equally.

6. The multi-stroke telescoping apparatus of claim 1, wherein the plurality of hollow female members are formed correspondingly with each other.

7. The multi-stroke telescoping apparatus of claim 1, wherein the driving member comprises a chain set, a steel rope set, or a belt set.

8. A lifting table, comprising:
   a tabletop,
   a plurality of multi-stroke telescoping apparatuses of claim 1, disposed under the tabletop, and
   a control unit, electrically connected to the controllers of the plurality of multi-stroke telescoping apparatuses to simultaneously control the plurality of multi-stroke telescoping apparatuses to adjust a height of the tabletop.

9. A folding lifting bed, comprising:
   a folding mattress, comprising a plurality of mattresses pivotally connected with each other,
   a plurality of multi-stroke telescoping apparatuses of claim 1, disposed under the folding mattress,
   a support frame, the plurality of multi-stroke telescoping apparatuses disposed thereon relatively, and
   a control unit, electrically connected to the controllers of the plurality of multi-stroke telescoping apparatuses to respectively control the linear movement of the plurality of multi-stroke telescoping apparatuses.

10. The folding lifting bed of claim 9, wherein the support frame further comprises a plurality of moving wheelsets.

* * * * *